3,755,407
SULFATION PROCESS FOR SECONDARY ALCOHOLS

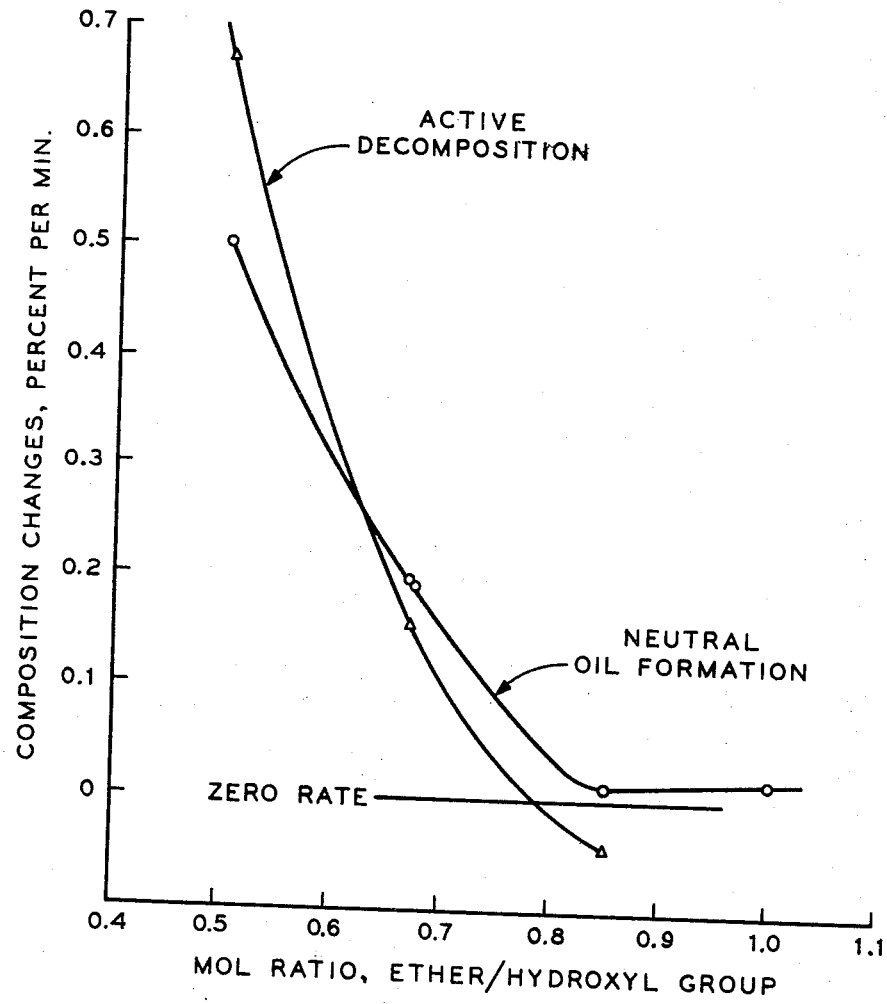

John B. Wilkes, Richmond, Calif., assignor to Chevron Research Company, San Francisco, Calif.
Filed Feb. 10, 1967, Ser. No. 615,209
Int. Cl. C07c *141/04*
U.S. Cl. 260—459                                    11 Claims

ABSTRACT OF THE DISCLOSURE

Inhibition of the formation of neutral oil by-products occurs in the sulfation of secondary alcohols by chlorosulfonic acid when a secondary alcohol ethoxylate is present with the secondary alcohol to be sulfated. The resulting alcohol sulfates are useful in cleaning, wetting, deterging and emulsifying mixtures.

BACKGROUND OF THE INVENTION

This invention relates to an improved method for sulfating secondary alcohols in which undesirable side reactions are inhibited in a novel manner. It also relates to the novel surface active compositions produced in the process. These materials are particularly useful per se and in compounded mixtures for cleaning, wetting, deterging, emulsifying and the like.

It is known in the sulfation of secondary alcohols that concurrent degradation reactions are responsible for poor yields and poor product quality. Strong acid such as chlorosulfonic acid and the like catalyzes the degradation of secondary alcohol ethoxylates. In particular sulfation products of secondary alcohols are known to contain excessive amounts of neutral oils. These impurities materially detract from the usefulness of the product. Substantial purification costs and relatively high costs due to poor yields are consequently inherent in conventional sulfations from which yields are generally only in the 60 mol percent range.

It has now been found that detergent range aliphatic secondary alcohol sulfations with strong mineral acid, such as chlorosulfonic acid, are improved materially by adding partially ethoxylated lower secondary aliphatic alcohol to the s-alcohol feed prior to the sulfation reaction. Thus when sufficient of the lower secondary alcohol ethoxylate has been added to yield an ether to hydroxyl group mol ratio for the resulting mixture in the range from about 0.1 to about 4, neutral oil forming side reactions are so greatly inhibited that yields of the order of 90 mol percent and higher are readily obtained under sulfation reaction temperatures below about 70° C. and with reasonably efficient mixing conditions. Excess acid should be avoided.

Surprisingly, neither the expected neutral oil by-product formation nor acid catalyzed degradation of secondary alcohol ethoxylate is an appreciable problem in the use of the feed mixtures of the instant invention. In general the sulfation reaction product mixture can be utilized for further processing in the production of surface active materials without intermediate purification stages.

By a detergent range secondary aliphatic alcohol is meant an alcohol of the formula ROH in which R is a secondary aliphatic hydrocarbon radical containing from about 8 to 30 carbon atoms. This definition is meant to include molecular mixtures thereof.

By aliphatic radical is meant in general alkyl, alkenyl, cycloalkyl, cycloalkenyl, and combinations of the foregoing radicals.

By a lower secondary aliphatic alcohol is meant by definition alcohols in which R in the foregoing definition is in the $C_6$ to $C_{20}$ range, inclusive.

PREFERRED EMBODIMENT

In a preferred embodiment of the instant process a $C_{12}$–$C_{18}$ secondary alcohol mixture, for example, as obtained from conversion of a corresponding $C_{12}$–$C_{18}$ petroleum-derived mixture having a high n-alkane content, is reacted with about one mol of ethylene oxide per mol of alcohol in a pressure autoclave at a temperature in the range 90–115° C. using an acidic catalyst, for example, about .002–.005 mol of a boron trifluoride-etherate complex, per mol of alcohol. With good mixing and heat exchange, a reaction time of about 15–30 minutes is adequate. Trace amounts of unconverted ethylene oxide are then vented. The resulting product contains 40–60 mol percent of unconverted secondary alcohol and has an ether to hydroxyl group ratio of about 1. On the average the secondary alcohol ethoxylate portion of the product contains about three oxyethylene groups per mol.

The partially ethoxylated secondary alcohol product mixture is then passed to a sulfation reactor fitted for temperature control at 5–15° C., fitted for efficient stirring and for spray feeding chlorosulfonic acid having a particle sizing in the 1–40$\mu$ range into the stirred alcohol. For each mol of hydroxyl in the modified alcohol 0.98–1.05 mol of chlorosulfonic acid is desirably introduced into the feed while maintaining the above temperature.

The sulfation reaction is rapid and exothermic. With an efficient cooling and feed means, the addition and reaction are usually completed in 5–30 minutes. As the reaction proceeds hydrogen chloride gas is evolved and is vented and carried from the reactor in a dry, inert gas stream, for example, nitrogen. The positive outward flow of the gas also excludes undesirable trace water vapor contamination of the reaction system.

Upon completion of the sulfation reaction, and depending upon the desired ulttimate use, the sulfated alcohol-half ester is immediately neutralized with a suitable base, for example, with sodium hydroxide.

Detergent range alcohols are in general suitable feeds for the instant process. A preferred feed class is the petroleum derived $C_{10}$–$C_{20}$ secondary alkanols and mixtures thereof.

Representative secondary alcohols contemplated for use in the process are 2-heptanol, 3-octanol, 4-dodecanol, 2-hexadecanol, 5-decanol, 9-eicosanol, 3-tridecanol, 7-octadecanol, 6-pentadecanol, 4-heptadecanol, 3-nonanol; cyclooctanol, cyclohexanol, cyclododecanol; 6-cyclohexyl-3 - undecanol, 1 - cyclohexyl-5-octanol; 2,3-dimethyl-7-dodecanol, 2-methyl-5-hexadecanol, 2-methyl-8-nonanol, 3-ethyl-10-dodecanol; 10-i-propyl-4-hexadecanol and the like secondary alcohols. Other suitable alcohols are those obtained by hydrogenation of ketone or aldol condensation products (see for example U.S. 2,870,220, column 3), e.g. 2,6,8-trimethyl-4-nonanol and the like.

Representative of the preferred class of secondary alcohol feeds are those obtained by partial oxidation of $C_{10}$–$C_{20}$ petroleum refinery alkane cuts, and in particular the high, i.e. at least 60 mol percent, n-alkane content fractions.

One or two of the hydrogen atoms of the hydrocarbon radical of the subject secondary alcohols can be replaced by an inert substituent group such as chloride, phenyl, naphthyl or the like. Thus compounds such as 1-phenyl-3-butanol, 6-phenyl-3-decanol, 1-chloro-4-dodecanol, 2-p-chlorophenyl-5-nonanol and the like are also useful process feeds.

For satisfactory inhibition of neutral oil producing side reactions in the subject process, sufficient ethoxylated secondary alcohol should be present in the sulfation feed to yield an ether oxygen atom to hydroxyl group ratio for the feed of at least about 0.1 and preferably about 0.5. In the preferred in situ feed modification method described above, reaction of at least 0.5 ml. of ethylene oxide per mol of alcohol is required in order to yield the 0.5 value. Values in the range 0.5 to 1.5 are preferred.

Secondary alcohol sulfates have better foaming properties than their corresponding sulfated ethoxylates. With increasing ether to hydroxyl group mol ratios, progressively less of the unconverted secondary alcohol is present in the feed. For this and other practical reasons the amount of unconverted alcohol should not be less than about 40 mol percent, i.e., the mol ratio of ethoxylate to s-alcohol should not exceed about 1.5. Feed mixtures in which the ethoxylate to secondary alcohol mol ratio is in the range 1.5–1.1 to 1, respectively, are useful.

In the sulfation reaction, best results are obtained in general when chlorosulfonic acid is used as the agent. Some improvement results, i.e., as compared to unmodified s-alcohol feeds, in the instant process where stronger sulfating agents are employed, for example, sulfur trioxide and concentrated sulfuric acid.

ETHOXYLATION

The reaction of ethylene oxide with an alcohol is known in the art. Briefly, the in situ modifications of secondary alcohol feeds may be effected with or without catalysts. The alcohol in the liquid phase is mixed with ethylene oxide. In the absence of a catalyst elevated temperatures, i.e., up to about 300° C., and a pressure sufficient to insure good contacting of the alcohol with the volatile oxide are required. Preferably the milder conditions and rapid reaction rates afforded by the use of catalysts, e.g., strong alkali, mineral acids, Lewis acids and the like, as known in the art are preferred. Inorganic bases such as alkali metal and alkaline earth metal oxides, hydroxides, alcoholates and the like are useful. Sulfuric acid, phosphoric acid, boron trifluoride etherate and the like acids are also representative useful catalytic ethoxylation agents.

The desired inhibitory effect can also be accomplished i.e., other than by the preferred in situ feed modification described above, by adding separately prepared ethoxylated lower aliphatic s-alcohol to the detergent range s-alcohol feed. In many circumstances this may be preferable as: (1) where the ethoxylation stage is inconvenient, (2) specific alcohol ethoxylates are preferred feed modifiers, and (3) in particular where mol fractions of the product in the form of secondary alcohol monoester sulfate, i.e., s-ROSO$_3$H or the corresponding neutralized salt, in excess of about 80 percent, are desired. For example, smaller relative amounts of ethoxylated lower s-alcohol may be added, and these will necessarily have a higher $n$ value in the formula RO(CH$_2$CH$_2$O)$_n$H in order to provide an adequate ether to hydroxyl group ratio for the feed to the process. Ordinarily $n$ should not exceed about 25, preferably 10.

Where separate addition of ethoxylated alcohol to the secondary alcohol feed is made, best results in terms of product performance are usually obtained when the secondary alcohol precursor of the ethoxylate contains on the average a few less carbon atoms than the secondary alcohol which is to be sulfated. Lower and higher molecular weight secondary alcohol ethoxylates may also be added and yet achieve a satisfactory product.

Sulfation

For satisfactory sulfation of the subject detergent range s-alcohol feeds, particular reaction conditions are desirable. Substantially the stoichiometric equivalent of chlorosulfonic acid relative to the alcohol, secondary plus ethoxylated secondary alcohol, should be used. Excess chlorosulfonic acid in any appreciable amount, for example, of the order of about a 20 mol percent excess and higher, promotes product degradation. On the other hand, unsulfated secondary alcohol in the neutralized product adversely affects foaming properties and represents a yield loss. Preferably the mol ratio of acid to feed hydroxyl is in the range of 0.98–1.05 to 1, respectively. A ratio in the range .95–1.1 to 1 is usually satisfactory.

Local and transitory excesses of the acid over the alcohol should be avoided particularly for the preferred neat reaction, i.e., as carried out in the absence of inert diluents. Dilution techniques such as high speed stirring, baffled reactor vessels, thin film reactors and small particle feeding techniques and the like procedures suffice in general to eliminate local excesses. Where solvent handling, recovery and losses are relatively unimportant, the use of inert diluents such as methylene chloride, chlorocarbons, saturated volatile hydrocarbon mixtures and the like are suitable means for minimizing localized excesses of chlorosulfonic acid and undesirable local superheating effects.

Chlorosulfonic acid reacts readily with alcohols at ordinary ambient temperatures and lower, and these are usually satisfactory. Elevated temperatures, for example, of the order of about 70° C. and higher, should be avoided. With increasing temperature, side reactions are increasingly favored. Similarly product color becomes poorer as the reaction temperature is increased. The reaction temperature should be at least sufficient to maintain a liquid reaction system.

NEUTRALIZATION OF SULFATION PRODUCT

After the reaction of the chlorosulfonic acid with the alcohol feed is completed (addition time, 5 to 30 minutes plus digestion time, if required), the product should be immediately neutralized by adding the sulfation product to sufficient of the base of choice to achieve a substantially neutral pH, i.e., in the range from about 6.5 to 7.5. Suitable bases are those known in the detergent art, i.e., alkali metal or alkaline earth metal oxides, hydroxides, carbonates, bicarbonates, weak organic acid salts and the like, as well as the nitrogen bases such as ammonia, amines, ethanol-amines and the like and mixtures thereof, i.e., detergent bases. In general aqueous solutions, ethanolic solutions and the like are preferable. Sodium, potassium and ammonium hydroxide are preferred. As in the case of the sulfation reaction, elevated neutralization temperatures should be avoided. (See for example J. Am. Oil Chemists Soc., 32, pp. 313–316 (1955).)

The following examples will serve to further illustrate the invention.

ETHER OXYGEN ATOM TO HYDROXYL GROUP RATIO EFFECT

Example 1

The results summarized in FIG. 1 following were obtained from sulfations carried out in glass turbomixers at about 0° C. using chlorosulfonic acid and n-C$_{14-15}$-s-alcohol feeds and sufficient ethoxylated n-C$_{11-15}$-s-alcohol to yield the indicated ether to hydroxyl group ratios. The modified s-alcohol feeds were diluted with equal volumes of isopentane, and the chlorosulfonic acid was introduced via a capillary injection feed tube. Samples of the reaction mixture were removed at various time intervals, and neutralized rapidly by mixing with a 50–50 alcohol-water solution of sodium hydroxide which had previously been cooled to 0° C. The alcohol sulfate content was determined by titration with tertiary alkyl ammonium chloride (ASTM D 1681–62, paragraph 28, except that an ethanol-water medium is used in place of the n-butanol specified). Neutral oil content was determined by the method of ASTM D 1570–63, paragraphs 24–27.

The experimental results illustrated in FIG. 1 below show that in the absence of added secondary alcohol ethoxylate, concurrent neutral oil forming side reactions in the sulfation of secondary alcohols are substantial side reactions. When, however, sufficient ethoxylated secondary alcohol is added, the side reactions are inhibited. Since the rate of loss of the sulfated alcohol active corresponds substantially to the rate of gain of undesirable neutral oil, the latter is clearly formed at the expense of the former.

The above data indicate that ether-hydroxyl mol ratios for the s-alcohol feed may be as low as 0.1 and lower and yet be salutory in terms of product stabilization. At mol ratios of the order of 0.85, the inhibition is substantially complete at 0° C.

At higher sulfation temperatures somewhat larger ether to hydroxyl mol ratios are required to obtain corresponding degrees of inhibition. Thus at 16° C. a ratio of about 1.3 is required to obtain the same roughly complete inhibition as results from the 0.85 ratio at 0° C. At about 30° C. the estimated corresponding ratio is about 2, and at 50° C. this value is in the range 2.5–3.5 or possibly 4.

SULFATION OF UNMODIFIED s-ALCOHOL FEED

Example 2

In a manner analogous essentially to the method of Example 1, an unmodified secondary alcohol feed was sulfated using chlorosulfonic acid. To the turbomixer was added a charge of 230 g. (1 mol) and 188 g. of isopentane dilute. By means of a capillary injector over a period of 22 minutes and while maintaining the reaction mixture temperature at 3–14° C., 118 g. (1 mol) of chlorosulfonic acid was added to the charge. After a ten minute digestion at 6–9° C. to complete the reaction the product was neutralized using cold sodium hydroxide solution. The product had the following composition:

Mol percent on s-alcohol feed
s-Alcohol sulfate _____ 54
Neutral oil _____ 46

SULFATION OF MODIFIED s-ALCOHOL FEED

Example 3A.—In situ modification

Secondary alcohol mixtures of the $C_{14}$–$C_{17}$ molecular range were reacted with ethylene oxide using boron trifluoride-dietherate or sodium hydroxide as the catalyst as follows:

(I) $BF_3 \cdot (CH_3CH_2)_2O$ catalysis.—To a 1-liter ethoxylation flask (cf. pp. 76–79 of Higher Oxo Alcohols by L. F. Hatch, John Wiley & Sons (1957)) was added a charge of 500 g. (2.2 mols) of a $C_{14-15}$ secondary alcohol mixture and 0.3 ml. of $BF_3$-etherate catalyst. While maintaining the flask and contents' temperature at 82–87° C., 115 g. (2.6 mols) of ethylene oxide was added over a period of 120 minutes. The resulting crude product mixture contained about 55 percent unconverted s-alcohol and had an ether to hydroxyl group mol ratio of about 1.2.

(II) Sodium hydroxide catalysis.—In the reactor as in Example 3A (I) above was added a charge of 500 g. (2.04 mols) of $C_{15-17}$ secondary alcohol obtained from hydration of a corresponding n-alkene (average mol weight of alcohol was 244). The alcohol contained 1.5 weight percent of olefin. The reactor and contents were purged with nitrogen gas, 2 grams of powdered sodium hydroxide were then added, and the mixture was heated to about 138° C., and the purge continued for 30 minutes. With vigorous stirring over a period of 77 minutes while maintaining temperature at 135–145° C. 113 g. (2.6 mols) of ethylene oxide were added and reacted with the alcohol charge. The sodium hydroxide catalyst in the cooled reaction product was then neutralized by addition of glacial acetic acid. The resulting crude reaction product contained about 65 percent unconverted secondary alcohol and had an ether to hydroxyl group mol ratio of 1.3.

Without distillation or the like purification, the modified feeds prepared as above were then sulfated at temperatures in the range 0–10° C. with chlorosulfonic acid using a 1.0 mol ratio of s-ROH to acid. About an equal weight of inert isopentane diluent was added to the feeds. Pertinent conditions and the results were in general as described for Example 1 and as noted below in Table I. After the sulfations were completed, the product was neutralized by the addition to sufficient sodium hydroxide solution to yield about a 7.0 pH. Analyses were then made by conventional means including cationic titrations using methylene blue indicator for determination of active, gas liquid phase chromatography for the neutral oil and the like.

TABLE I

| No. | s-Alcohol C-range | Mol. wt. | Mol percent ethoxylated | Mol ratio ether to hydroxyl grp. | Product percent of theory Active[1] | Neutral oil | Ethoxylation catalyst |
|---|---|---|---|---|---|---|---|
| A | 14–15 | 226 | 35 | 1.2 | 93 | 6 | $BF_3 \cdot E$ |
| B | 15–17 | 244 | 60 | 1.2 | 92 | 6 | NaOH |
| C | 15–17 | 244 | 40 | 0.9 | 89 | 7 | $BF_3 \cdot E$ |

[1] $ROSO_3Na$.

Example 3B.—Feed modification by separate inhibitor addition

As in Example 3A above, s-alcohol feeds were reacted with chlorosulfonic acid except that the ethoxylate inhibitor was added separately rather than by in-situ preparation. It was a commercial material being a $C_{11-15}$ s-alcohol ethoxylate having an average molecular weight of 338 and having an average of three ethoxylate groups per molecule. The results are listed below in Table II.

TABLE II

| No. | C-range | Mol. wt. | Mol percent ethoxylated | Mol ratio: ether to hydroxyl | Ratio acid to ROH | Product percent of theory Active[1] | Neutral oil |
|---|---|---|---|---|---|---|---|
| D | 14–15 | 226 | 40 | 1.17 | 1.1 | 96 | 4.4 |
| E | 14–15 | 226 | 40 | 1.17 | 1.0 | 95 | 5.5 |
| F | 14–15 | 226 | 40 | 1.17 | 0.9 | 86 | 11 |

[1] $ROSO_3Na$.

The foregoing demonstrate that the ethoxylated s-alcohol inhibitor can be added rather than formed in situ. This permits an extra degree of freedom in that optimization of the feed, i.e., in regard to ether-hydroxyl ratio, relative proportions of s-alcohol to inhibitor and the like, is facilitated.

Example 4

In a manner analogous to Example 3B above, a modified s-alcohol feed was sulfated except that no inert diluent was added to the feed mixture. The chlorosulfonic acid was introduced into the s-alcohol as a micro-fine spray by means of a spray nozzle. The reactor was covered for the exclusion of atmospheric moisture. The feed was a mixture of equal weights of $C_{15}$–$C_{17}$ s-alcohol, average molecular weight 246, and $C_{11}$–$C_{15}$ s-alcohol ethoxylate, average molecular weight 338. The conditions were:

Temperature, ° C. _____ 5–10
Acid to hydroxyl ratio _____ 0.98
Time to add acid, min. _____ 8
Digestion time, min. _____ 30

The neutralized product was found by titration to be 90+% detergent active, i.e., s-alcohol and s-alcohol ethoxylate-mono-ester sulfate.

Example 5

In the table following comparative detergency test results are given for two representative sulfated s-alcohol feeds and for a commercial linear alkylbenzene sulfonate detergent. The material used in Run A below was obtained using an aliquot of the crude sulfation product No. A of Table I, Example 3A above. The material for Run B below corresponds to product from No. C of Table I, Example 3A above.

Two hundred gram aliquots of each of the above designated sulfation products were neutralized by the addition of 400 g. of ice and about 400 mls. of 2 N ethanolic sodium hydroxide solution. Isopentane diluent was stripped from the neutralization product using carbon dioxide gas, and the resulting solution was filtered. The test stock solutions had the following composition:

| Solution No. | Percent, weight | | |
|---|---|---|---|
| | Active | Neutral oil | NaCl |
| 5A | 25.2 | 1.31 | |
| 5B | 23.2 | 1.49 | 0.94 |

The following comparisons were made using (1) natural sebum soil; (2) a 25/40/7/1/19/8 formulation (weight percentages and the ratios relate to active, sodium polyphosphate, sodium silicate, sodium carboxy methyl cellulose, sodium sulfate and water components, respectively), and the detergent performance was tested by standard tergotometric relative detergency procedures in formulated compositions with the following results [6.0=good; 2.0=poor]:

| No. | s-ROH[1] or standard | Color percent saturation, 10% soln. | Relative detergency 0.20% concentration | |
|---|---|---|---|---|
| | | | Hardness | |
| | | | 50 p.p.m. | 180 p.p.m. |
| A | $C_{11}$–$C_{15}$ | 0.0 | 7.6 | 7.0 |
| B | $C_{15}$–$C_{17}$ | 0.8 | | |
| C | ABS[2] | | 7.4 | 6.5 |

[1] Starting alcohol is isomeric mixture of s-alcohol.
[2] A commercial linear alkylbenzene sulfonate active used.

The foregoing data demonstrate that the secondary alcohol monoester sulfates of the present invention are excellent surface active materials.

These materials are also readily and efficiently degraded biologically, even by biological attack under anaerobic conditions.

By the instant process straight chain secondary alcohols of mixed molecular weight values, i.e., over a carbon number range as $C_{10}$–$C_{20}$ and of mixed positional isomers, i.e., in regard to the relative position of the hydroxyl oxygen bonding to the hydrocarbon chain, yield, as shown by the above tests, especially useful detergent products.

From a comparison of Examples 2 and 3 above, it is evident that the addition of secondary alcohol ethoxylate to a secondary alcohol feed is an effective means for the inhibition of neutral oil formation in the sulfation of such alcohols.

As the range of embodiments of this invention is large, and many may appear to be widely different, yet not depart from the spirit and scope thereof, it is to be uderstood that this invention is not limited to the specific embodiments demonstrated above, except as defined in the appended claims.

I claim:

1. The method of inhibiting neutral oil by-product formation in the liquid phase sulfation of a detergent range alcohol feed by reaction of said feed with a sulfation agent consisting essentially of chlorosulfonic acid at a temperature below about 70° C., wherein the alcohol is of the formula ROH, in which R is a secondary hydrocarbon radical having a carbon atom content in the range from about 8 to 30, thereby producing the corresponding secondary alcohol monoester sulfate, which comprises adding to said feed an ethoxylate of an alcohol of the formula ROH, wherein R is a secondary hydrocarbon radical having a carbon atom content in the range from about 6 to 20, said addition being in an amount sufficient for the resulting feed mixture to have (1) an ether oxygen atom to hydroxyl group ratio in the range from about 0.1 to 4; and (2) an alcohol ethoxylate to secondary alcohol mol ratio of less than about 1.5;

wherein the average number of ethoxylate groups of said added ethoxylate alcohol is less than about 25; said radicals being selected from the group consisting of alkyl, alkenyl, cycloalkyl, cycloalkenyl, and combinations of these radicals.

2. The method of claim 1 wherein the ether-hydroxyl group ratio of the feed mixture is in the range 0.5 to 1.5, and wherein the amount of said acid relative to the hydroxyl content of the feed mixture is in the mol range, respectively, of .95–1.1 to 1.

3. The method of claim 1 wherein the alcohol feed has a carbon atom content in the range from about 10 to 20.

4. The method as in claim 1 wherein the secondary alcohol ethoxylate is produced in situ in said feed by reaction of ethylene oxide with a portion of the feed.

5. The method of inhibiting neutral oil by-product formation in the liquid phase sulfation of a detergent range alcohol feed by reaction of said feed with a sulfation agent consisting essentially of chlorosulfonic acid at a temperature below about 70° C., wherein the alcohol is of the formula ROH, in which R is a secondary hydrocarbon radical or an inertly substituted hydrocarbon radical having a carbon atom content in the range from about 8 to 30, thereby producing the corresponding secondary alcohol monoester sulfate, which comprises adding to said feed an ethoxylate of an alcohol of the formula ROH, wherein R is a secondary hydrocarbon radical or an inertly substituted secondary hydrocarbon radical having a carbon atom content in the range from about 6 to 20, said addition being in an amount sufficient for the resulting feed mixture to have (1) an ether oxygen atom to hydroxyl group ratio in the range from about 0.1 to 4; and (2) an alcohol ethoxylate to secondary alcohol mol ratio of less than about 1.5;

wherein the average number of ethoxylate groups of said added ethoxylate alcohol is less than about 25; said radicals being selected from the group consisting of alkyl, alkenyl, cycloalkyl, cycloalkenyl, and combinations of these radicals, and said substitutued radicals containing not more than two inert substituents selected from the group consisting of chlorine, phenyl and naphthyl.

6. The process for the sulfation of a detergent range petroleum derived secondary alkanol having a carbon atom content in the range from about 10 to 20, which comprises (a) reacting said alkanol with ethylene oxide in the liquid phase at a temperature in the range from about 50 to 300° C. and a pressure sufficient to maintain said liquid phase and wherein for each mol of secondary alcohol from about 0.1 to 4.0 mols of ethylene oxide is reacted, thereby producing the resulting modified alcohol feed; and (b) adjusting the resulting modified feed to a temperature in the range below about 50° C. and above the freezing point of the feed and while maintaining said temperature adding about a stoichiometric equivalent, based upon feed, of a sulfation agent consisting essentially of chlorosulfonic acid;

thereby reacting chlorosulfonic acid with substantially all of said modified feed.

7. The process of claim 6 wherein the resulting sulfation product mixture s neutralized to a pH in the range from about 6.5 to 7.5 by the addition of about the stoichiometric equivalent of at least one base selected from the group consisting of alkali metal, alkaline earth metal, ammonia and ethanolamine bases.

8. The process for the sulfation of a detergent range alcohol of the formula ROH, in which R is a secondary hydrocarbon radical having a carbon atom content in the range from about 8 to 30, which comprises (a) adding to said alcohol an ethoxylate of the formula RO[CH$_2$CH$_2$O]$_n$H and mixtures thereof, wherein R is a secondary hydrocarbon radical having a carbon atom content in the range from 6 to 20 and $n$ is a number less than 25; said addition being in an amount sufficient to produce a mol ratio in the resulting mixture of ethoxylate to alcohol in the range from about 1.5–1.1 to 1, respectively, and a ratio of ether oxygen atom to hydroxyl groups in the range from about 0.1–4 to 1, respectively; and (b) maintaining said alcohol ethoxylate mixture at a temperature below 50° C. and above the freezing point of the feed while adding about a stoichiometric equivalent, based upon feed of a sulfation agent consisting essentially of chlorosulfonic acid; thereby reacting chlorosulfonic acid with at least 90 mol percent of said mixture, said radicals being selected from the group consisting of alkyl, alkenyl, cycloalkyl, cycloalkenyl, and combinations of these radicals.

9. The process of claim 8 wherein said R radicals are straight chain groups.

10. The process of claim 8 wherein the resulting sulfation product mixture is neutralized by reaction with at least one base selected from the group consisting of alkali metal, alkaline earth metal, ammonia and ethanol-amine bases.

11. The process for the sulfation of a detergent range alcohol of the formula ROH, in which R is a secondary hydrocarbon radical or an inertly substituted hydrocarbon radical having a carbon atom content in the range from about 8 to 30, which comprises (a) adding to said alcohol an ethoxylate of the formula RO[CH$_2$CH$_2$O]$_n$H and mixtures thereof, wherein R is a secondary hydrocarbon radical or an inertly substituted hydrocarbon radical having a carbon atom content in the range from 6 to 20 and $n$ is a number less than 25; said addition being in an amount sufficient to produce a mol ratio in the resulting mixture of ethoxylate to alcohol in the range from about 1.5–1.1 to 1, respectively, and a ratio of ether oxygen atoms to hydroxyl groups in the range from about 0.1–4 to 1, respectively; and (b) maintaining said alcohol ethoxylate mixture at a temperature below 50° C. and above the freezing point of the feed while adding about a stoichiometric equivalent, based upon feed of a sulfation agent consisting essentially of chlorosulfonic acid; thereby reacting chlorosulfonic acid with at least 90 mol percent of said mixture, said radicals being selected from the group consisting of alkyl, alkenyl, cycloalkyl, cycloalkenyl, and combinations of these radicals, and said substituted radicals containing not more than two inert substituents selected from the group consisting of chlorine, phenyl and naphthyl.

References Cited

UNITED STATES PATENTS

| 3,468,805 | 9/1969 | Gufo et al. | 252—152 |
| 2,771,484 | 11/1956 | Blaser et al. | 260—459 |
| 3,395,170 | 7/1968 | Walts et al. | 260—458 |
| 3,413,331 | 11/1968 | Beiser et al. | 260—458 |

FOREIGN PATENTS

| 913,001 | 12/1962 | England | 260—458 |

OTHER REFERENCES

E. Gilbert, "Sulfonation and Related Reactions (N.Y., 1965) p. 352.

LEON ZITVER, Primary Examiner

L. B. DeCRESCENTE, Assistant Examiner

U.S. Cl. X.R.

252—161; 260—458, 457